Aug. 6, 1940.  E. V. KELPSCH  2,210,811
SHAFT COUPLING
Filed Sept. 16, 1939  2 Sheets-Sheet 1
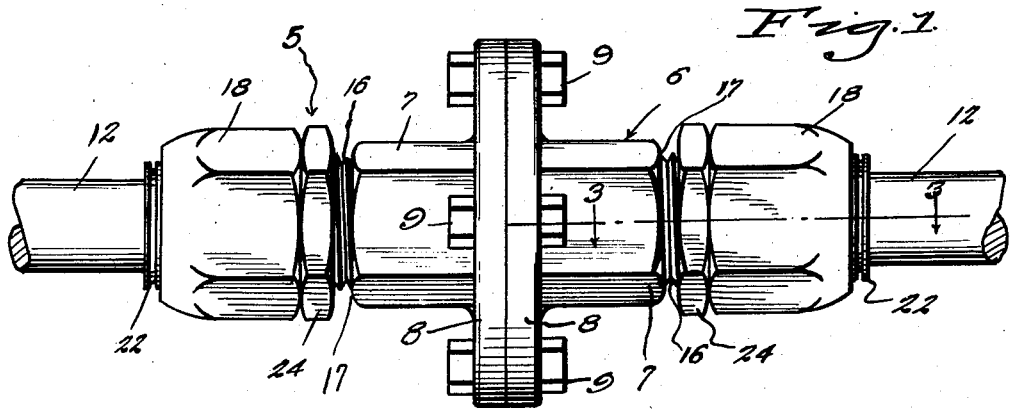
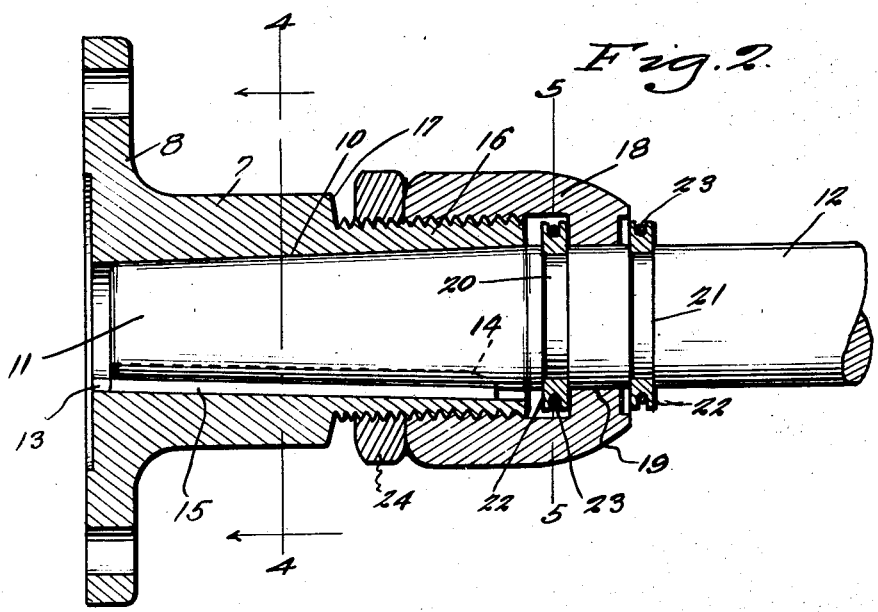
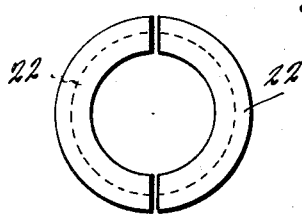
Inventor
Edmund V. Kelpsch
By Clarence A. O'Brien
and Hyman Berman
Attorneys Aug. 6, 1940.   E. V. KELPSCH   2,210,811
SHAFT COUPLING
Filed Sept. 16, 1939    2 Sheets—Sheet 2
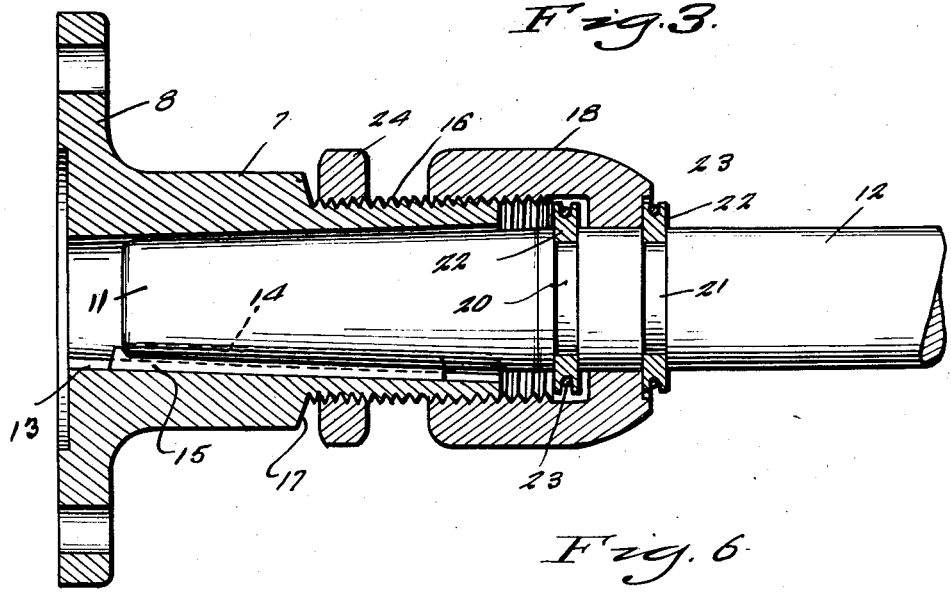
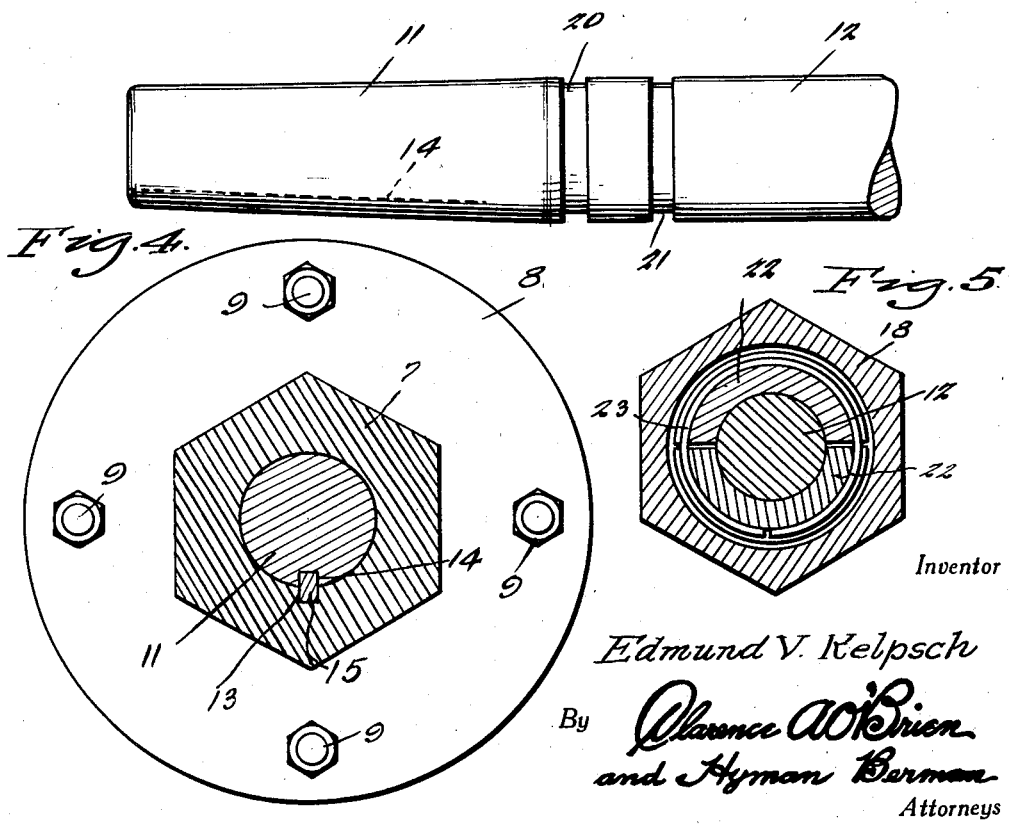
Inventor
Edmund V. Kelpsch
By Clarence A. O'Brien
and Hyman Berman
Attorneys Patented Aug. 6, 1940

2,210,811

UNITED STATES PATENT OFFICE 2,210,811

SHAFT COUPLING

Edmund V. Kelpsch, Houma, La.

Application September 16, 1939, Serial No. 295,265

1 Claim. (Cl. 287—53)

This invention relates to shaft couplings, and the object of the invention is to provide a shaft coupling that will positively lock itself to a shaft without the use of set screws or clamp bolts commonly used, and also to provide a means of removing the coupling at will without the use of pullers or the necessity of driving or pressing the coupling from the shaft.

The invention together with its objects and advantages will be best understood from a study of the following description taken in connection with the accompanying drawings wherein:

Figure 1 is an elevational view showing the application of the invention.

Figure 2 is a sectional view through one of the coupling elements mounted on one end of one of the shafts to be coupled together.

Figure 3 is a view similar to Fig. 2 but with the coupling element loose on the shaft end.

Figures 4 and 5 are transverse sectional views, taken substantially on the lines 4—4 and 5—5 respectively of Fig. 2.

Figure 6 is an elevational view of an end of a shaft to be coupled and

Figure 7 is an elevational view of a split retainer ring forming part of the invention.

Referring more in detail to the drawings it will be seen that the improved coupling comprises a pair of complemental, and substantially identical coupling elements indicated by reference numerals 5 and 6 respectively.

Each of the coupling elements include a sleeve 7 provided at one end thereof with an apertured flange 8 through the medium of which and bolts 9 the flanged ends of the sleeves 7 of the coupling elements 5 and 6 are secured together.

The sleeve 7 is provided with a conical bore 10 to accommodate the conical end 11 of one of the shafts 12 to be coupled together.

As shown clearly in Figs. 2 and 3 the sleeve 7 is provided with an internal way 13 complementing a way 14 provided in the end 11 of a shaft 12 to accommodate a key 15 through the medium of which the sleeve 7 is held on the shaft end against rotative movement relative thereto.

Also the sleeve 7 is provided with a circumferentially reduced externally threaded end portion 16 presenting intermediate the end of the sleeve a shoulder 17.

Cooperable with the sleeve 7 is a collar 18 that is internally threaded complemental to the thread of the sleeve section or portion 16 for threaded engagement therewith as shown in the drawings.

At at one end thereof the collar 18 is provided with an internal flange 19 that is accommodated, as shown, about the shaft 12 between a pair of circumferential grooves 20, 21 provided in the shaft.

Each of the grooves 20, 21 is designed to accommodate a two-part externally grooved collar 22 that is secured within its groove 20, or 21, as the case may be on the shaft 12 through the medium of a split wire retaining ring 23.

Also threadedly accommodated on the portion 15 of the sleeve 7 and the collar 18 is a nut 24.

To tighten the coupling 5 or 6, as the case may be, on a shaft end 12 the parts of the coupling are assembled and arranged on the shaft in an obvious manner and as shown in Fig. 3. The operator then threads the collar 18 home on a threaded end 16 of the sleeve 7 in a manner to obviously draw the sleeve 7 inwardly along the tapered end 11 of the shaft 12 to substantially the position shown in Fig. 2. The nut 24 is then threaded home into abutting engagement with the collar 18 as shown in Fig. 2 whereupon the sleeve 7 is secured rigidly on the end 11 of the shaft 12 so as to turn therewith.

With the couplings 5 and 6 thus secured on the ends of the respective shafts 12 the flange ends 8 of the couplings are brought into intimate contact, and at said ends the sleeves 7 are then bolted together through the medium of the bolts 9 thus completing, in a quick and efficient manner the coupling of the ends 11 of the respective shafts 12 together.

When it is desired to loosen a coupling 5 or 6, as the case may be, relative to the end 11 of a shaft 12 the collar 18 is threaded in a retrograde or reverse manner and by reason of the engagement of the flange 19 of the collar with the outermost ring 22 the end 11 of the shaft will be caused to move outwardly with respect to the bore of the sleeve 7, and with the lock nut 24 threaded forwardly to substantially the position shown in Fig. 6, and collar 18 entirely disengaged from the sleeve 7, the end 11 of the shaft may be readily withdrawn from the bore of the sleeve.

It will thus be seen that I have provided a shaft coupling the complemental parts of which may be readily secured on the ends of the respective shafts to be coupled together, and said complemental coupling elements readily loosened with respect to the associated shaft ends for removal therefrom or for any other purpose desired.

It is believed that a clear understanding of the construction, utility, and function of the invention will be had without any further detailed description thereof; and it will be further understood that while I have herein referred to the invention as a "shaft" coupling, it will be understood that the invention is not necessarily limited to that purpose but may be applied wherever a coupling of this character may be found suitable.

What is claimed is:

A shaft coupling, and in combination, a shaft having a tapered end and a pair of axially spaced circumferential grooves inwardly from said tapered end of the shaft, a coupling sleeve on the tapered end of the shaft, said sleeve and shaft end being complementally provided with ways, a key engaging in said complemental ways and coacting therewith to secure the sleeve and shaft against relative rotative movement, said coupling sleeve having a threaded end portion, a collar disposed circumjacent said shaft and having internal threads complementing the threads of said sleeve, and said collar being provided with an internal flange, and ring members removably mounted on the shaft and seated in the grooves thereof at opposite sides of said flange.

EDMUND V. KELPSCH.